(12) United States Patent
Stiernagle

(10) Patent No.: US 10,049,351 B2
(45) Date of Patent: *Aug. 14, 2018

(54) RETAIL LOCATION ROBOTIC WALL SYSTEM AND MOBILE RETAIL SALES VEHICLE

(71) Applicant: BBY SOLUTIONS, INC., Richfield, MN (US)

(72) Inventor: Chad Stiernagle, Eagan, MN (US)

(73) Assignee: BBY SOLUTIONS, INC., Richfield, MN (US)

(*) Notice: Subject to any disclaimer, the term of this patent is extended or adjusted under 35 U.S.C. 154(b) by 4 days.

This patent is subject to a terminal disclaimer.

(21) Appl. No.: 15/362,428

(22) Filed: Nov. 28, 2016

(65) Prior Publication Data

US 2017/0076267 A1 Mar. 16, 2017

Related U.S. Application Data

(60) Division of application No. 13/562,744, filed on Jul. 31, 2012, now Pat. No. 9,520,012, which is a
(Continued)

(51) Int. Cl.
*G06Q 20/18* (2012.01)
*G06Q 10/08* (2012.01)
(Continued)

(52) U.S. Cl.
CPC ............ *G06Q 20/18* (2013.01); *B60P 3/0257* (2013.01); *G06Q 10/087* (2013.01); *G07F 9/023* (2013.01); *G07F 11/002* (2013.01); *G07F 11/165* (2013.01)

(58) Field of Classification Search
CPC ...... B60P 3/0257; G07F 9/023; G07F 11/002; G07F 11/165; G06Q 20/18
(Continued)

(56) References Cited

U.S. PATENT DOCUMENTS 4,270,319 A 6/1981 Spasojevic
4,530,549 A 7/1985 Genna
(Continued)

FOREIGN PATENT DOCUMENTS

CA 1252430 A 4/1989
DE 3941754 A1 6/1991
(Continued)

OTHER PUBLICATIONS

"U.S. Appl. No. 13/472,532, Non Final Office Action dated Apr. 17, 2015", 7 pgs.
(Continued)

*Primary Examiner* — Michael Collins
(74) *Attorney, Agent, or Firm* — Schwegman Lundberg & Woessner, P.A.

(57) ABSTRACT

A robotic retail wall is presented allowing for the dispensing of merchandise within a retail location. The robotic wall includes commodity products and robotics that pick and deliver products to consumers in response to input at a kiosk. The robotics and products are separated from a retail space by a transparent barrier, allowing consumers in the retail space to view the actions of the robotics in retrieving a product. Behind the robotic wall is a product stocking area, where commodity products can be added to the robotic wall with assistance from the robotics.

22 Claims, 13 Drawing Sheets

Related U.S. Application Data continuation-in-part of application No. 13/472,532, filed on May 16, 2012, now Pat. No. 9,230,387.

(60) Provisional application No. 61/489,918, filed on May 25, 2011.

(51) Int. Cl.
 *B60P 3/025* (2006.01)
 *G07F 9/02* (2006.01)
 *G07F 11/00* (2006.01)
 *G07F 11/16* (2006.01)

(58) Field of Classification Search
 USPC ............................... 700/232, 236, 242
 See application file for complete search history.

(56) References Cited

U.S. PATENT DOCUMENTS

| | | | |
|---|---|---|---|
| 4,567,359 A | 1/1986 | Lockwood | |
| 4,591,070 A | 5/1986 | Wirstlin | |
| 5,206,814 A | 4/1993 | Cahlander et al. | |
| 5,362,197 A | 11/1994 | Rigling | |
| 5,544,996 A | 8/1996 | Castaldi et al. | |
| 5,595,263 A | 1/1997 | Pignataro | |
| 5,720,547 A | 2/1998 | Baird | |
| 5,822,216 A | 10/1998 | Satchell, Jr. et al. | |
| 5,838,566 A | 11/1998 | Conboy et al. | |
| 5,893,697 A | 4/1999 | Zina et al. | |
| 5,927,544 A | 7/1999 | Kanoh et al. | |
| 6,059,092 A | 5/2000 | Jerue et al. | |
| 6,064,921 A | 5/2000 | Pippin et al. | |
| 6,210,093 B1 | 4/2001 | Hannen et al. | |
| 6,321,138 B1 | 11/2001 | Livesay | |
| 6,360,904 B1 | 3/2002 | Schilb et al. | |
| 6,393,339 B1 | 5/2002 | Yeadon | |
| 6,424,111 B1 | 7/2002 | Romig | |
| 6,490,502 B2 | 12/2002 | Fellows | |
| 6,535,790 B2 | 3/2003 | Nakano et al. | |
| 6,547,096 B1 | 4/2003 | Chirnomas | |
| 6,584,375 B2 | 6/2003 | Bancroft et al. | |
| 6,609,047 B1 | 8/2003 | Lipps | |
| 6,688,451 B2 | 2/2004 | Derby et al. | |
| 6,694,217 B2 | 2/2004 | Bloom | |
| 6,842,665 B2 | 1/2005 | Karlen | |
| 6,962,267 B2 | 11/2005 | Herzog et al. | |
| 7,039,495 B1 | 5/2006 | Conboy et al. | |
| 7,203,570 B2 | 4/2007 | Karlen | |
| 7,261,511 B2 | 8/2007 | Felder et al. | |
| 7,364,050 B2 * | 4/2008 | Guard .................. | B60P 3/0257 221/131 |
| 7,381,022 B1 | 6/2008 | King | |
| 7,444,204 B2 | 10/2008 | Chirnomas | |
| 7,530,473 B2 | 5/2009 | Chirnomas | |
| 7,536,283 B2 | 5/2009 | Potter et al. | |
| 7,621,108 B1 | 11/2009 | Brastauskas et al. | |
| 7,780,392 B2 | 8/2010 | Rogers et al. | |
| 7,787,681 B2 | 8/2010 | Zhang et al. | |
| 7,809,470 B2 | 10/2010 | Shoenfeld | |
| 7,896,243 B2 | 3/2011 | Herskovitz | |
| 7,967,543 B2 | 6/2011 | Criswell et al. | |
| 7,988,015 B2 | 8/2011 | Mason, II et al. | |
| 8,078,316 B2 | 12/2011 | Blust et al. | |
| 8,092,140 B2 | 1/2012 | Baker et al. | |
| 8,140,187 B2 | 3/2012 | Campbell et al. | |
| 8,162,174 B2 | 4/2012 | Hieb et al. | |
| 8,175,925 B1 | 5/2012 | Rouaix | |
| 8,204,624 B2 | 6/2012 | Zini et al. | |
| 8,239,062 B2 | 8/2012 | Vahlberg et al. | |
| 8,281,553 B2 | 10/2012 | Kim | |
| 8,308,414 B2 | 11/2012 | Schifman et al. | |
| 8,374,967 B2 | 2/2013 | Chirnomas | |
| 8,403,614 B2 | 3/2013 | Bastian, II et al. | |
| 8,417,380 B2 | 4/2013 | Kuehnrich et al. | |
| 8,494,672 B2 | 7/2013 | Chirnomas et al. | |
| 8,494,673 B2 | 7/2013 | Miranda et al. | |
| 8,562,277 B2 | 10/2013 | Criswell | |
| 8,571,700 B2 | 10/2013 | Keller et al. | |
| 8,571,701 B2 | 10/2013 | Lunak et al. | |
| 8,571,708 B2 | 10/2013 | Rob et al. | |
| 8,620,472 B2 | 12/2013 | Mockus et al. | |
| 8,632,294 B2 | 1/2014 | Subotincic | |
| 8,678,232 B2 | 3/2014 | Mockus et al. | |
| 8,695,814 B2 | 4/2014 | Van Ooyen et al. | |
| 8,705,388 B2 | 4/2014 | Gong et al. | |
| 8,706,293 B2 | 4/2014 | Lu | |
| 8,712,586 B2 | 4/2014 | Allinson | |
| 8,738,177 B2 | 5/2014 | Van Ooyen et al. | |
| 8,768,789 B2 | 7/2014 | Smith et al. | |
| 8,935,002 B2 | 1/2015 | Ho | |
| 9,132,975 B2 | 9/2015 | Criswell | |
| 9,224,137 B1 | 12/2015 | Tomasi et al. | |
| 9,230,387 B2 * | 1/2016 | Stiernagle ............... | G07F 9/023 |
| 9,428,336 B2 | 8/2016 | Hagen | |
| 9,430,788 B2 * | 8/2016 | Stiernagle ............... | G07F 9/023 |
| 9,520,012 B2 * | 12/2016 | Stiernagle ............... | G07F 9/023 |
| 2003/0120387 A1 | 6/2003 | Sherwin | |
| 2004/0059463 A1 | 3/2004 | Coughlin | |
| 2004/0071539 A1 | 4/2004 | Anater, Jr. et al. | |
| 2004/0191032 A1 | 9/2004 | Foulke et al. | |
| 2005/0055361 A1 | 3/2005 | Deal | |
| 2005/0063801 A1 | 3/2005 | Durand et al. | |
| 2005/0127698 A1 | 6/2005 | Baum | |
| 2005/0143857 A1 | 6/2005 | Chirnomas | |
| 2005/0216120 A1 | 9/2005 | Rosenberg et al. | |
| 2005/0238465 A1 | 10/2005 | Razumov | |
| 2006/0045674 A1 | 3/2006 | Craven | |
| 2006/0182604 A1 | 8/2006 | Clark et al. | |
| 2007/0071585 A1 | 3/2007 | Henkel | |
| 2008/0008568 A1 | 1/2008 | Harris et al. | |
| 2008/0122615 A1 | 5/2008 | Shoenfeld | |
| 2008/0284139 A1 | 11/2008 | Shockley | |
| 2009/0005905 A1 | 1/2009 | Kuehnrich et al. | |
| 2009/0164328 A1 | 6/2009 | Bishop et al. | |
| 2009/0312864 A1 | 12/2009 | Hanel | |
| 2010/0017296 A1 | 1/2010 | Spignesi, Jr. et al. | |
| 2010/0121481 A1 | 5/2010 | Talley et al. | |
| 2010/0138037 A1 | 6/2010 | Adelberg et al. | |
| 2010/0234990 A1 | 9/2010 | Zini et al. | |
| 2011/0071928 A1 | 3/2011 | Young | |
| 2011/0153071 A1 | 6/2011 | Claessen et al. | |
| 2011/0172815 A1 | 7/2011 | Kim | |
| 2011/0229296 A1 | 9/2011 | van Ooyen et al. | |
| 2011/0313811 A1 * | 12/2011 | Urban .................. | B60P 3/0257 705/7.25 |
| 2012/0029685 A1 | 2/2012 | Keller et al. | |
| 2012/0029687 A1 | 2/2012 | Hagen et al. | |
| 2012/0033209 A1 | 2/2012 | Osterkamp et al. | |
| 2012/0101627 A1 | 4/2012 | Lert | |
| 2012/0104785 A1 | 5/2012 | Hixson et al. | |
| 2012/0136477 A1 | 5/2012 | Merrow et al. | |
| 2012/0219397 A1 | 8/2012 | Baker | |
| 2012/0298688 A1 * | 11/2012 | Stiernagle ............... | G07F 9/023 221/155 |
| 2012/0303154 A1 | 11/2012 | Stiernagle | |
| 2013/0123978 A1 | 5/2013 | Stark et al. | |
| 2013/0253700 A1 | 9/2013 | Carson et al. | |
| 2013/0297066 A1 | 11/2013 | Alvern | |
| 2014/0052498 A1 | 2/2014 | Marshall et al. | |
| 2014/0100769 A1 | 4/2014 | Wurman et al. | |
| 2014/0212250 A1 | 7/2014 | Wolter | |
| 2016/0104220 A1 | 4/2016 | Stiernagle | |
| 2017/0039607 A1 | 2/2017 | Stiernagle | |

FOREIGN PATENT DOCUMENTS

| | | |
|---|---|---|
| EP | 0169156 A1 | 1/1986 |
| JP | 61150908 A | 7/1986 |

(56) References Cited

FOREIGN PATENT DOCUMENTS

WO     WO-2009065145 A1     5/2009
WO     WO-2012019189 A2     2/2012

OTHER PUBLICATIONS

"U.S. Appl. No. 13/472,532, Notice of Allowance dated Nov. 12, 2015", 6 pgs.
"U.S. Appl. No. 13/472,532, Notice of Non-Compliant Amendment dated Feb. 24, 2015", 2 pgs.
"U.S. Appl. No. 13/472,532, Response filed Feb. 3, 2015 to Restriction Requirement dated Dec. 3, 2014", 6 pgs.
"U.S. Appl. No. 13/472,532, Response filed Mar. 23, 2015 to Notice of Non-Compliant Amendment dated Feb. 24, 2015", 6 pgs.
"U.S. Appl. No. 13/472,532, Response filed Oct. 15, 2015 to Non Final Office Action dated Apr. 17, 2015", 8 pgs.
"U.S. Appl. No. 13/472,532, Restriction Requirement dated Dec. 3, 2014", 5 pgs.
"U.S. Appl. No. 13/562,744, Non Final Office Action dated May 6, 2016", 7 pgs.
"U.S. Appl. No. 13/562,744, Notice of Allowance dated Oct. 21, 2016", 6 pgs.
"U.S. Appl. No. 13/562,744, Response filed Jul. 13, 2016 to Non Final Office Action dated May 6, 2016", 7 pgs.
"U.S. Appl. No. 13/562,744, Restriction Requirement dated Oct. 6, 2015", 7 pgs.
"U.S. Appl. No. 14/973,239, Notice of Allowance dated Apr. 27, 2016", 11 pgs.
"U.S. Appl. No. 14/973,239, PTO Response to Rule 312 Communication dated My 19, 2016", 2 pgs.
"U.S. Appl. No. 14/973,239, Supplemental Preliminary Amendment filed Jan. 26, 2016", 11 pgs.
"U.S. Appl. No. 14/973,239, Preliminary Amendment filed Dec. 17, 2015", 4 pgs.
"U.S. Appl. No. 13/562,744, Response filed Jan. 26, 2016 to Restriction Requirement dated Oct. 6, 2015", 10 pgs.
"B. Small Goods Storage, B6. Miniload single store", (r) Copyright 2008, (2008), 3 pgs.
"B. Small Goods Storage, B6. Miniload Multi-Store", (r) Copyright 2008, (2008), 3 pgs.
"Clerk? What's a clerk?", Lancaster Newspapers. Inc, (Oct. 31, 2002).
"Everything-Robotic", The Robot Report, (Oct. 2, 2012).
"Kroger debuts kiosk concept at area college campus", The Blade, (Feb. 15, 2012).
"Robotic Grocery Stores Pop Up Nationwide", Enterprise Efficiency, (Apr. 5, 2012).
"The End of Separation: Man and Robot as Collaborative Coworkers on the Factory Floor", Shelf Plus, (Aug. 8, 2013).
Murray, Charles J, "Now There's a Robot", Design News, (Mar. 26, 1990), 78.
"U.S. Appl. No. 15/222,505, Non Final Office Action dated Oct. 6, 2017", 12 pgs.

\* cited by examiner

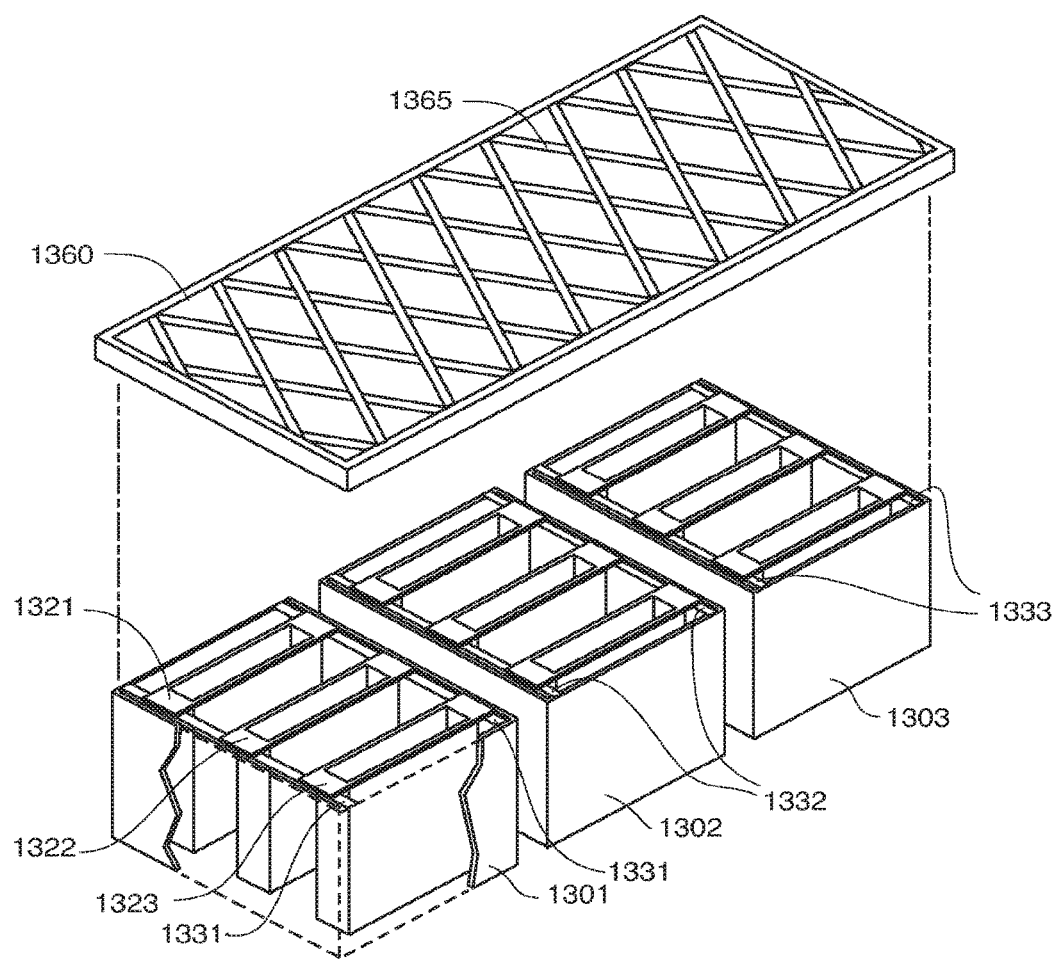

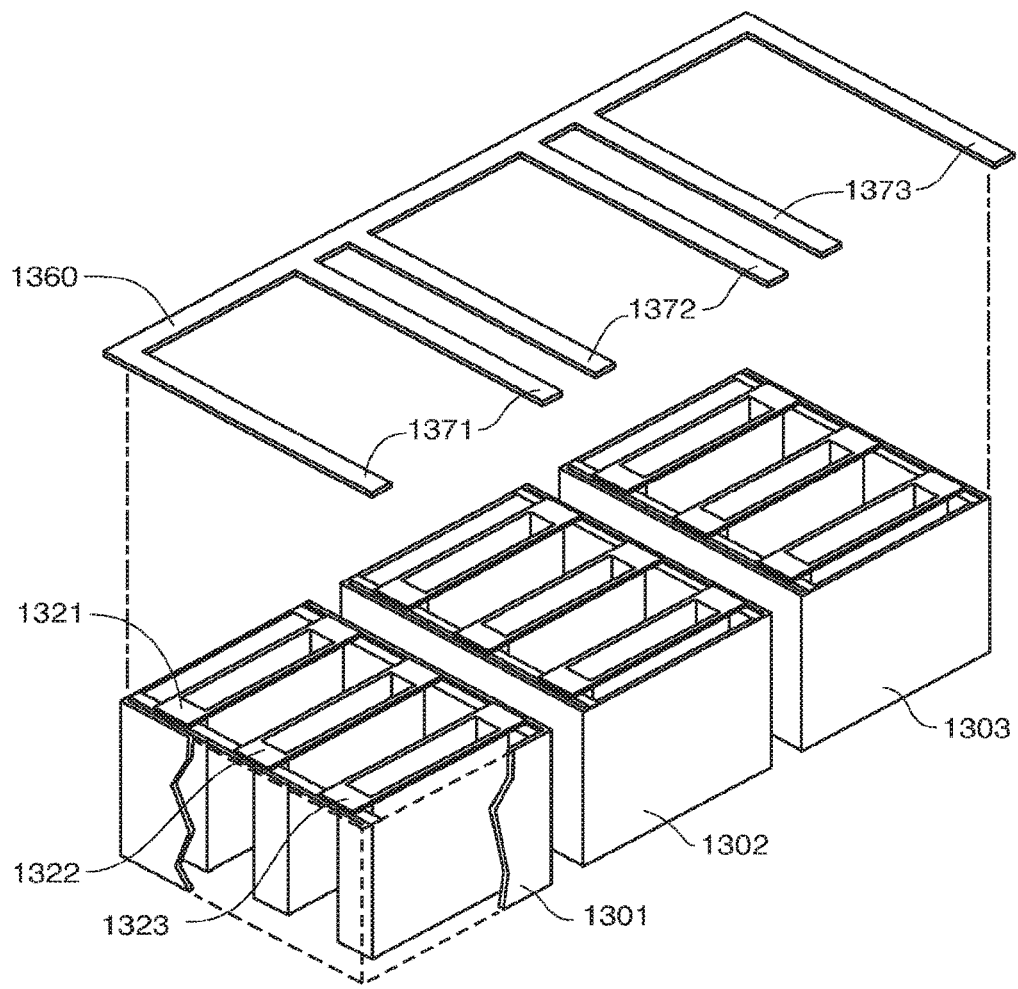

RETAIL LOCATION ROBOTIC WALL SYSTEM AND MOBILE RETAIL SALES VEHICLE

RELATED APPLICATIONS

The present application is a divisional of U.S. patent application Ser. No. 13/562,744, filed Jul. 31, 2012 and issued as U.S. Pat. No. 9,520,012 on Dec. 13, 2016, which is a continuation-in-part of U.S. application Ser. No. 13/472,532, filed May 16, 2012, which claims the benefit of U.S. Provisional Application Serial Number 61/489,918, filed May 25, 2011, the disclosures of which are hereby incorporated by references.

FIELD OF THE INVENTION

The present application relates to the field of physical retail sales locations. More particularly, the described embodiments relate to a robotic wall implemented in a retail store location to dispense and sell commodity products. In an alternate embodiment of the invention, a robotic wall is implemented as a mobile retail sales vehicle.

BRIEF DESCRIPTION OF THE DRAWINGS

FIG. 13B is a schematic view of a second embodiment of a system for securing items on a hanging rack in a mobile vehicle.

FIG. 13C is a schematic view of a third embodiment of a system for securing items on a hanging rack in a mobile vehicle.

DETAILED DESCRIPTION

Figure 1:
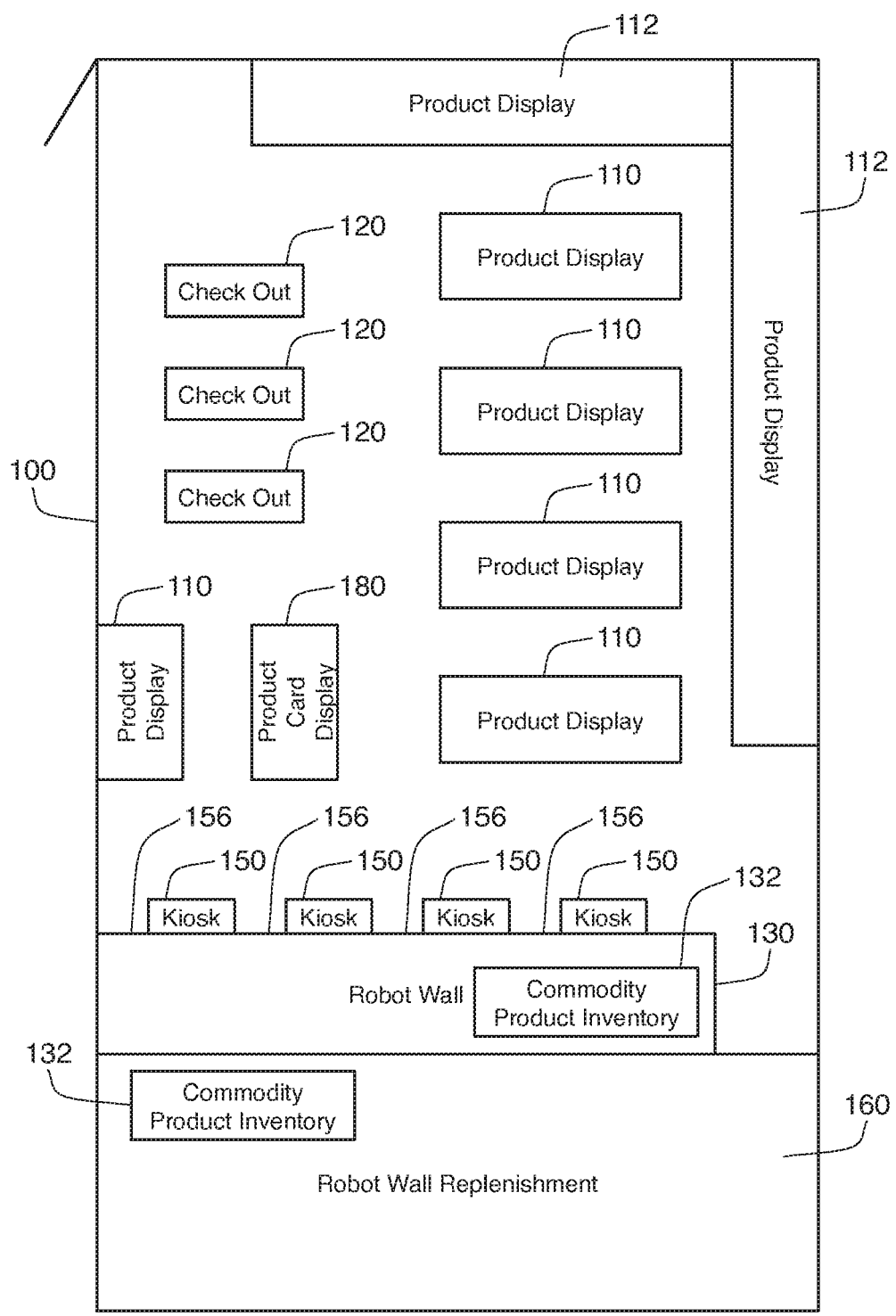
FIG. 1 is a schematic diagram of a retail sales location utilizing one embodiment of a robotic wall.

FIG. 1 shows a retail location 100 such as an electronics store. The retail location 100 includes a variety of product displays 110 and 112 in which products are displayed to customers. Product displays 110 are free-standing units, while product displays 112 are designed to be located against a wall of the retail location 100. Customers that are interested in a product can remove the product from the displays 110 or 112 and bring the product to a checkout location 120 for purchase. In order to allow customers to help themselves to merchandise, the product displays 110-112 generally keep all products within easy reach of the customer. Thus, even though a retail location may have a wall height of 15-20 feet or higher, product displays 110-112 generally do not place products higher than six or seven feet.

Like most retailers, electronic retailers sell commodity, low-margin products as well as higher-margin products. For instance, CDs, DVDs, Blu-ray disks, and video games are low-margin, commodity-type products for an electronics store, while televisions and appliances that may be sold with service plans are higher-margin products. It can be difficult to properly allocate limited product display locations 110-112 between these two different types of goods. While it is tempting to reduce the display locations 110-112 allocated to commodity-type products, customers frequently visit a retail location 100 in order to purchase the commodity product. Thus the retail location 100 must make the purchase experience for commodity products at least as inviting as for the higher margin products. An electronics store that reduces product display space for music, movies, and games in order to display more televisions and appliances risks reducing customer visits to the store location 100. Furthermore, if the commodity products are displayed in a less desirable location in the store, or in a more compact and crowded environment, the customer may also choose to shop for such goods elsewhere.

In the retail location 100 shown in FIG. 1, commodity product inventory 132 such as movies, games, and music are stored and dispensed from a robotic wall 130. While a portion of commodity product inventory 132 is displayed in robotic wall 130, a portion may also be hidden from view in robot wall replenishment area 160. Kiosks 150 are located along robot wall 130 to allow customers to select products from inventory 132. In response to a customer selection, the robot wall 130 retrieves the desired product from inventory 132 and dispenses it to the customer at product delivery area 156.

Figure 2:
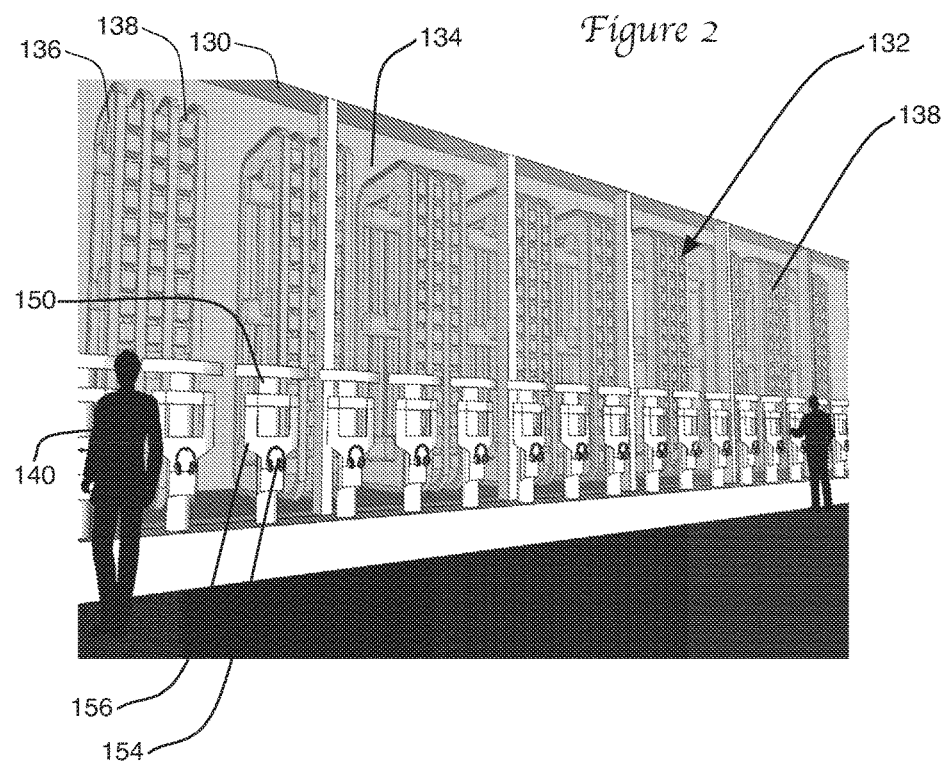
FIG. 2 is a perspective drawing of one embodiment of a robotic wall using kiosks.

An example of a robotic wall 130 is shown in FIG. 2. Commodity products are located behind a transparent wall 134 in the robotic wall 130. Robotics 136 select particular products 138 as desired by a customer 140 who interacts with the robotic wall 130 through a plurality of kiosks 150. Robotic wall 130 takes advantage of the otherwise underutilized vertical aspect of the retail location 100. Inventory 132 can be densely packed within the robotic wall 130, allowing the robot wall 130 to hold more products 138 per square foot of floor space. Because the entire height of a wall can be used to store inventory 132, the retail location 100 can carry a much greater selection of commodity products 138 than would otherwise be possible. Furthermore, because the products 138 are densely packed and stored vertically up the wall, the retail location 100 is able to free valuable floor space for high-margin products or for otherwise improving the retail shopping experience. It is estimated that in a traditional retail location, it would be possible to redeploy seventy percent of the space in a retail location 100 currently allocated to commodity products by use of the robotic wall 130. It would even be possible to shrink the retail location size 100 while still carrying the same inventory of products. In the preferred embodiment, the robotic wall 130 is greater than ten feet tall, perhaps reaching fifteen or twenty feet tall. Since the robotic wall 130 can extend along a wall, the preferred embodiment may be twenty feet long or longer.

Figure 3:
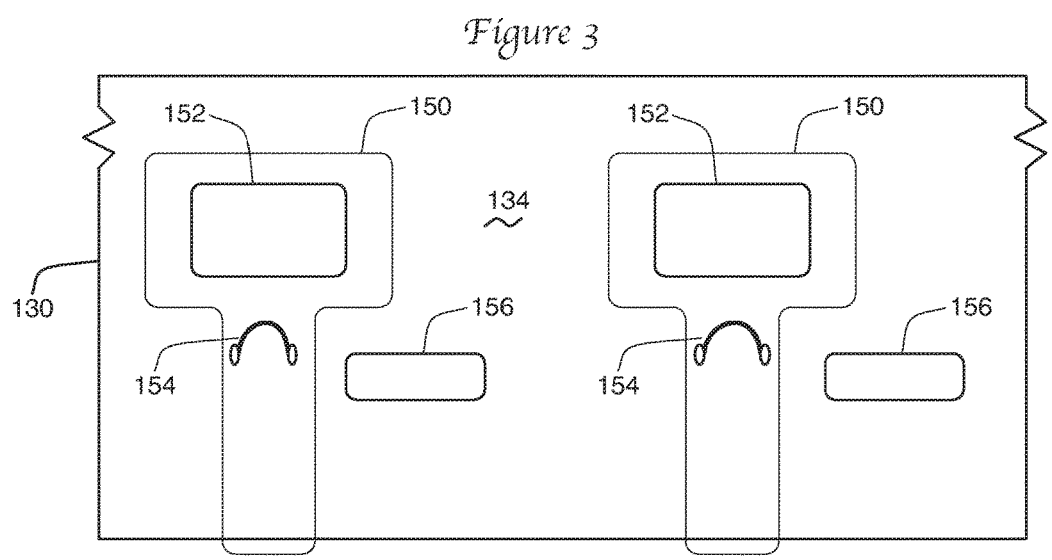
FIG. 3 is a view of a kiosk according to one embodiment.

FIG. 3 shows an embodiment of kiosks 150. The kiosks 150 are spaced evenly along the length of the robotic wall 130. In the preferred embodiment, multiple kiosks 150 are present, allowing many customers 140 to use robot wall 130 simultaneously. In FIG. 3, only two kiosks 150 are shown, but the preferred embodiment includes at least five and perhaps dozens of kiosks 150 for a single robotic wall, such as shown in FIG. 2. Each kiosk 150 may contain a visual display 152 and a headset 154. The kiosk 150 will also include a user input device, such as a touch screen 152 that allows the user to enter queries and make selections on the kiosk 150. Although it is not shown in FIG. 3, it is within the scope of the present invention to include keyboards, mice, and other input devices to facilitate user interaction with the kiosks 150. In the preferred embodiment, a product delivery area 156 is located in or near each kiosk 150. The product delivery area 156 may be a hole in the transparent barrier 134 that divides the main retail space of the retail location 100 from the interior of the robotic wall 130. The product delivery area 156 may include a conveyor or trap doors to move the select product from the reach of the robotics 136 to the reach of the consumers 140. Care should be taken when constructing the product delivery area 156 to prevent a consumer 140 from reaching into the interior of the robotic wall 130 both to prevent theft of products 138 and to prevent injury to the consumer 140.

Figure 4:
FIG. 4 is a visual display for browsing commodity products.

The kiosks 150 can be designed to allow the consumer 140 to browse the products 138 available in the commodity product inventory 132. FIG. 4 shows an example of a visual display 152 designed to make browsing for commodity products 138 interesting. Headsets 154 and displays 152 allow customers 140 to fully preview movie, music, and even gaming products at the kiosks 150. Preferably, the kiosks 150 have connectivity to the Internet, allowing the customer 140 to learn more information about the products 138 and to compare one product to another. In one embodiment, this connectivity is limited to a particular website, such as a website run by the retailer that provides the retail location 100. In other embodiments, connectivity is allowed to major media review sites, or even full Internet access. In addition, the visual display 152 of a kiosk 150 may allow the consumer 140 to express requests for products 138 that are not currently in inventory 132. The request can be a simple request that the product 138 be stocked in the robotic wall 130 at this location, or the request can include a request to purchase the products 138 and have the purchased products shipped to the retail location 100 or directly to the consumer 140.

Because wall 134 is transparent, customer 140 can see the robotics spring into action. By allowing robotics 136 to pick the products 138 and place the products in front of the consumer 140 at the kiosk 150, the robotic wall 130 creates a visually exciting retail experience. Consumers approach the robotic wall 130 to see the products 138 and the robotics 136. This visual robotic motion will attract attention from shoppers in the retail location 100, thereby increasing shopper excitement.

In one embodiment the kiosks 150 can be designed to receive payment, such as through credit or debit cards, gift cards, or cash. In this embodiment, a product 138 is not dispensed from the robotic wall 130 until payment has been received for the product 138. Alternatively, the robotic wall 130 can be used merely to dispense products, with the actual purchase taking place at traditional checkout locations 120 in the retail location 100. Regardless of whether payment is required before a product 138 is dispensed, the use of a robotic wall 130 should reduce theft, or "shrink," of commodity products, as the products themselves will not be accessible to customers who are only browsing through the inventory.

Restocking of the commodity product inventory 132 in the robotic wall 130 takes place behind the robotic wall 130. In FIG. 1, the restocking takes place in the robotic wall replenishment area 160. This can be a room behind the robotic wall 130 that can be used both for replenishment and for storage. In the preferred embodiment, replenishment area 160 is hidden from view and cannot be seen through the robot wall 130. Ideally, the robotics 136 in the robotic wall 130 will be used to help replenish the inventory retained in the wall 130. When a product 138 is added to the robotic wall 130, the robotics 136 can scan and identify the product, and record its location for later retrieval when identified by a consumer.

Figure 5:
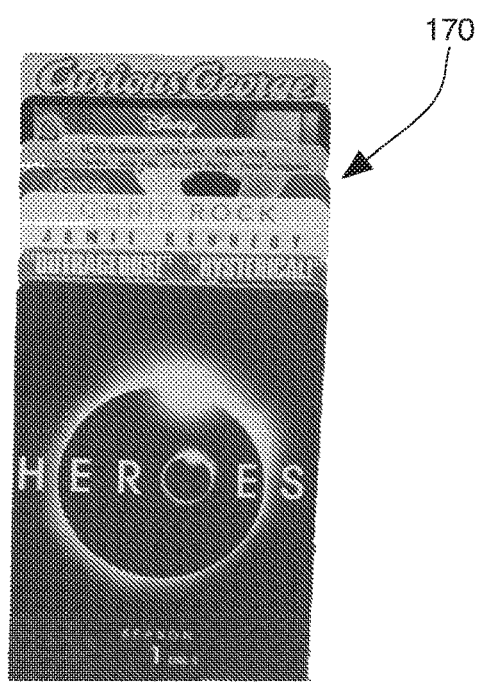
FIG. 5 is a plan view of a plurality of product cards.

In another embodiment, product cards, such as cards 170 shown in FIG. 5, can be used by customers 140 to select products 138 stored in the robot wall 130. Product cards 170 contain pictures and descriptions for the commodity products 138. Products 138 generally provide information on their packaging related to the contents of the product 138. Product cards 170 may contain information similar or identical to the information available on the packaging of products 138. This allows customers to have close to the same shopping experience that they had before the use of the robotic wall 130, as product cards 170 can be sorted and provided to the customer much like the products 138 themselves. The product cards 170 can contain a bar code or other identifier that can be read by the kiosk to identify the product 138 to the robotics 136. This embodiment allows customers to bypass the step of searching for products 138 at the visual display 152 of kiosk 150.

As shown in FIG. 1, it is possible to locate a product card display area 180 near the robotic wall 130. Because the cards are much slimmer than the actual products 138, the amount of the retail location 100 dedicated to displaying commodity products 138 is still greatly reduced (by as much as a factor of 22). Thus a retail location 100 can still allow physical browsing and present a much larger inventory 132 for the customer 140 while reducing the floor space dedicated to commodity products and shrink associated with product theft. Of course, it would be possible to still have certain products 138 on display in the retail location 100, allowing grab-and-go shopping for customers for the latest releases of music, movies, or games.

FIG. 5 shows a system 600 in which numerous retail locations 610 have implemented normal product display apparatuses (such as shelves, end caps, and island displays) 620 along with a robotic wall 630. In most retailers, the product mix that is displayed on the display apparatuses 620 are governed by a planogram. A planogram is a plan that determines the amount and location of product that will be displayed in the store, the layout and mix of the physical product display apparatuses 620, as well as the location of the products on each of the product displays 620. Most retailers design their retail locations 610 to be similar, such that numerous retail locations 610 will have similar or identical product display configurations. These similar locations 610 are then usually governed by a single planogram, such that a first retail location 610 will have the same product mix displayed in on the same product displays 620 as the next location 610. While some minor variations may be permitted between retail locations, large retailers prefer to have multiple locations 610 to use the same planogram. Other retailers have a variety of store formats (e.g., small, medium, and large retail locations). Each of these formats would have a separate planogram, but individual stores within the format are expected to use the same planogram. One obvious disadvantage of using a universal planogram over a variety of retail locations is that it is difficult or impossible to change the products being displayed and sold from one location to the next. To allow some variations, some retailers allocate a portion of the store to regional preferences. Frequently, the remainder of the store uses a universal planogram, and even the regional portion will likely be subject to a pre-defined planogram for that region.

To replenish products that are sold at a location 610, products are delivered to and received at the store's replenishment delivery area 640. This area may include truck loading docks, back room storage, and inventory locations. To restock the store shelves, employees of the location receive products from the delivery area 640, and then consult the planogram for the product displays 620. The planogram will set forth the exact location of each product to be stocked on the product displays 620 of the retail locations. Unfortunately, while this process is common to all retail stores, the requirement that the displays 620 must be restocked according to the planogram for that display greatly increases the time required to restock inventory at the retail location.

One benefit of the robotic walls 130, 630 is that replenishment of the wall does not take place according to a planogram. Because users select products in the robotic wall 130 through the displays 152 of the kiosks 150, there is no need for the product inventory 132 of the wall 130 to be maintained in a uniform matter.

Figure 6:
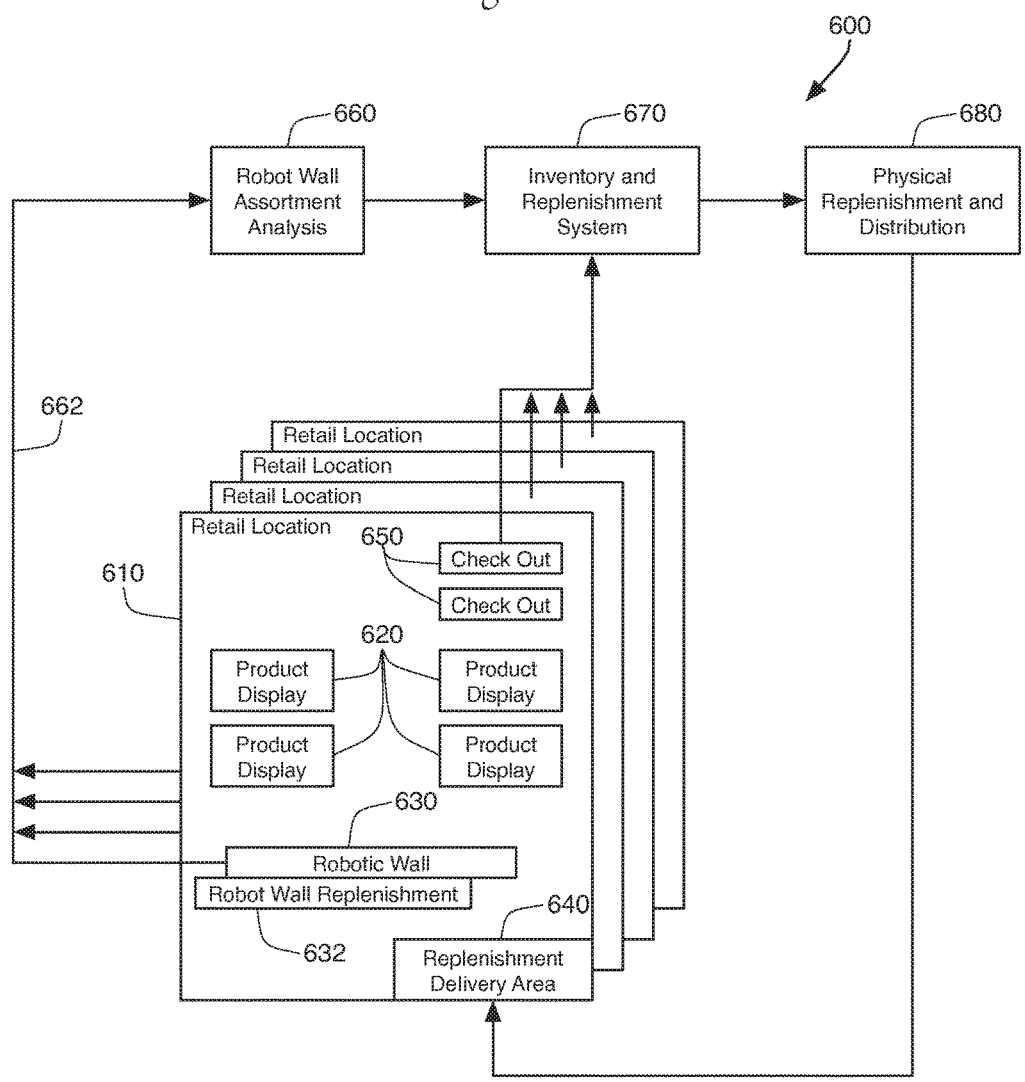
FIG. 6 is a schematic view of a replenishment system involving a plurality of retail locations using a robotic wall.

As shown in FIG. 6, products received at the retail location's replenishment delivery area 640 that are destined for the robotic wall 630 are added to the wall 630 through the replenishment system or area 632 behind (or beside) the wall 630. Since the products in the wall 630 are selected by users through kiosks and extracted and delivered through robotics, products can be added randomly to the wall inventory as long as the robotics track the location of each product added to the wall 630. Consequently, when products are added through the robot wall replenishment system 632, the robotics of the wall 630 receive the product, store the product in the inventory of the wall 630, and then track the location of that product within the inventory. When a user requests that product, the robotics will recall that location, and then select the product and deliver it to the user at the appropriate product delivery area.

When a product in the robotic wall 630 is delivered to a customer through a product delivery area in the wall 630, the robotic wall 630 notes that the product is no longer in its inventory. This information is shared with a remote computerized system 660 that analyzes the inventory and assortment of the products in the robotic wall 630. Communication with the remote system 660 takes place over a computerized network 662 such as the Internet. To facilitate this communication, both the robot wall assortment analysis computer system 660 and the robotic wall 630 contain network interfaces to communicate over this network. In the preferred embodiment, the network 662 is a TCP/IP network and the network interfaces include hardware and software components necessary to implement a TCP/IP protocol stack.

The remote system 660 comprises one or more server computers operating to receive data from a plurality of robotic walls 630 at a plurality of retail locations 610. These server computers 660 include a set of software instructions or interfaces stored on a non-volatile, non-transitory, computer readable medium such as a hard drive or flash memory device. A digital processor, such as a general purpose CPU manufactured by Intel Corporation (Mountain View, Calif.) or Advanced Micro Devices, Inc. (Sunnyvale, Calif.), accesses and performs the software. To improve efficiency, the processor may load software stored in memory into faster, but volatile RAM. The software operates on data, such as the inventory and delivery data received from the robotic walls 630. This data is stored in non-volatile memory and retrieved into RAM for analysis, recording, and reporting.

Data related to customer product delivery and product replenishment in the robotic walls 630 at the plurality of retail locations 610 is delivered to system 660 for analysis. In addition, the robotic walls 630 may allow customers to express requests for products that are not currently in inventory at the wall 630. These requests are also forwarded to system 660. The system 660 analyzes this data and determines an ideal product assortment for each individual robotic wall 630. If a first wall 630 sells more romantic comedy DVDs than the second wall 630, and the second wall 630 sells more "M" rated video games than the first wall 630, the system 660 will note the different desires of the customers at each wall 630 and change the assortment of products stored in inventory at the walls 630 to reflect these different desires.

This store-by-store differentiation of products in the walls 630 differs from the assortment of products presented to customers in the product displays 620, as the product displays 620 are all governed by a planogram that covers multiple retail locations 610. The products in the display 620 are purchased by customers at one or more check out (Point-of-Sale or POS) devices 650. These POS devices 650 read bar codes or other indicators off of the items purchased, total the purchases, accept payments, and print receipts for customers. The multiple POS devices 650 in a retail location 610 typically are networked together to a POS server (not shown) at the retail location 610, which then communicates sales data to a remote inventory and replenishment server system 670. This server system 670 is configured much like system 660, it that it consists of one or more computers with processors, non-volatile memory, RAM, network interfaces, software, and data. The inventory and replenishment system 670 accepts data from the POS devices 650 at a plurality of store locations 610 and uses this information to track inventory at the stores 610.

When the inventory for particular products is running low relative to the expect inventory in the governing planogram, the system 670 will request that additional product be sent to that store. Typically a system of distribution warehouses hold inventory that can be delivered to stores on an as-needed bases through a trucking distribution network. When products need to be delivered to a particular retail location 610, the inventory and replenishment system 670 will request that the physical replenishment and distribution system 680 will supply those products to that location 610. The physical replenishment and distribution system 680 may comprise its own server to receive network communications from the inventory replenishment system 670 and advise the warehouses and trucks on the delivery of the appropriate products to the retail locations 610. The distribution system server would also be configured like systems 670 and 660. In other embodiments, the functions of the distribution system server and the inventory and replenishment server 670 could be combined into a single server system that combines the functionality of both servers. When the physical replenishment and distribution system delivers products to the retail locations 610 through its distribution system (such as via trucks delivering goods from warehouses), the products are received at the replenishment delivery area 640 and distributed throughout the store location 610 as described above.

In one embodiment, the robot wall assortment analysis system 660 utilizes the existing product ordering and delivery system that is used by the retail locations 610 to maintain inventory in the product displays 620. In this embodiment, when the robot wall assortment analysis system 660 determines that additional products should be delivered to a robotic wall 630 at a retail location, it sends a request to the inventory and replenishment system 670 to add the necessary products to the next product delivery to that retail location 610. This communication can take place via computer-to-computer network messaging, such as a secure message passing over the Internet. The inventory and replenishment system 670 adds the additional products as requested to the next delivery, and the physical replenishment and distribution system 680 delivers these products destined to the robotic wall 630 to the replenishment deliver area 640 of that retail location 610.

In this way the robotic wall 630 for each location 610 can have a unique assortment of products based on the user interactions with the wall 630 at that location even though the product assortment on display on displays 620 remains governed by a multi-store planogram. At the same time, product replenishment for the wall 630 is controlled by a separate system 660, which itself integrates the actual product delivery to the location 610 with the main replenishment system that delivers products for physical product displays 620.

Figure 7:
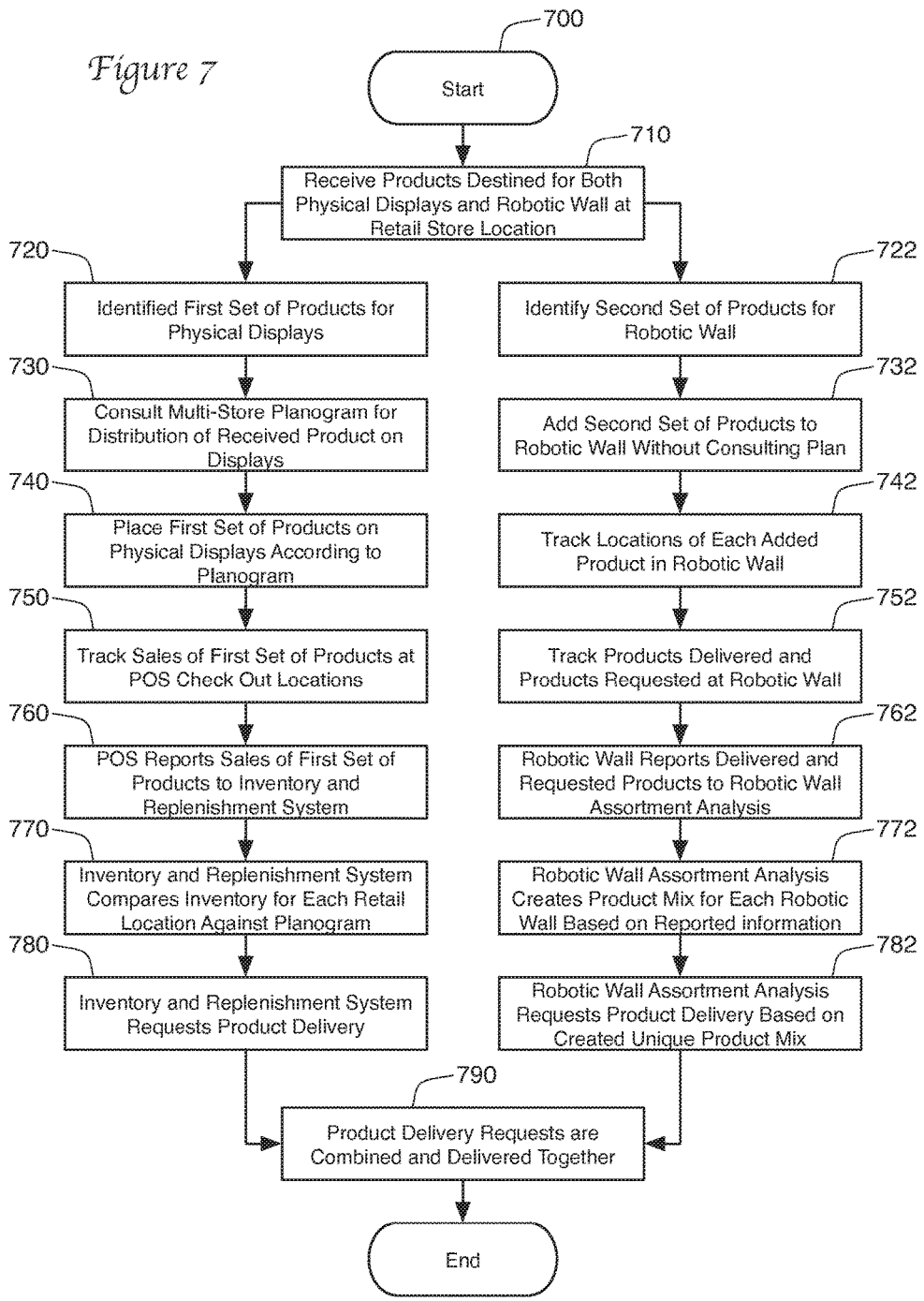
FIG. 7 is a flow chart showing a method for replenishing retail locations that use a robotic wall.

FIG. 7 shows a flow chart of a method 700 for replenishing retail locations that use a robotic wall. In step 710, products are received at a retail location 610. The products may be received at a replenishment delivery area 640 and include a first set of products destined for physical product displays 620 and a second set of products destined for a robotic wall 630. In step 720 the first set of products for physical displays are identified, and in step 722 the second set of products for the robotic wall are identified. The first and second set of products are each handled in a different but parallel manner. For the first set of products, a multi-store planogram is consulted in step 730 to determine where the first set of products should be distributed within the retail space 610. In step 740 the first set of products are displayed on physical product displays 620 according to the planogram. As the products on physical product displays 620 are sold, the product sales are tracked at step 750 at Point of Sale (POS) check out locations 650. Sales data from the POS are reported to an inventory replenishment system 670 in step 760. The sales data may be sent to the replenishment system 670 immediately as products are sold, or the POS may collect sales data and send the data to the replenishment system 670 at predetermined intervals, such as once per day.

Once sufficient sales data are collected from POS 650, the inventory and replenishment system 670 determines in step 770 which products in the first set of products for physical displays 620 need to be distributed to retail location 610. Replenishment system 670 accomplishes this task by comparing the actual inventory in the retail location 610 with the multi-store planogram. Because the planogram is standardized from store to store, the replenishment system merely compares the number of products in store inventory to the number of products required by the planogram. In step 780 the inventory and replenishment system 670 makes a request for product from the physical replenishment and distribution system 680.

In contrast to the method used for the first set of products, the products destined for the robotic wall 630 are identified in step 722, then added to the robotic wall 630 in step 732 without consulting a planogram. The robotic wall 630 is responsible for assigning locations to each product. Because the robotic wall 630 does not require a planogram, the costs associated restocking products and with designing and administering planograms for a retail location 610 are diminished. In step 742 the location of each product added to robotic wall 630 is tracked. The robot wall system 630 is designed so that, although the physical location of each product within robot wall 630 may be arbitrary, the products can be located by the tracking system of the wall 630 and retrieved immediately upon demand. Each product may be identified at several different points at the retail location 610. The products may be tracked when they enter the robot wall replenishment area 632, when they are transferred from area 632 to robotic wall 630, when they are delivered from the robotic wall 630 to a consumer, and when they are purchased at a POS 650. In step 752, the method tracks products that are delivered and products that are requested by consumers at the robotic wall 630. Step 752 allows the system to aggregate data regarding consumer demand for products. In particular, the number of units sold and units requested for a given product may be used to improve product selection for the robotic wall 630 at retail location 610.

In step 762 data regarding delivered products and requested products are collected from the robotic wall 630 and reported to the robot wall assortment analysis system 660. In step 772 the assortment analysis system 660 uses data from each individual retail location 610 to create a customized product selection mix for each location 610 based on actual past product sales and product requests for each location. The reported information is used to optimize product selection on a store-by-store basis. In step 782 the robotic wall assortment analysis system 660 sends a request for the unique product mix to the inventory and replenishment system 670.

After the first set of requested products for physical display and the second set of requested products for the robot wall are determined, at step 790 the product delivery requests are combined together and sent as a single request to the physical replenishment and distribution system 680. Step 790 simplifies the product replenishment process. The physical replenishment and distribution system 680 does not require separate orders, saving time and labor costs.

Figure 8:
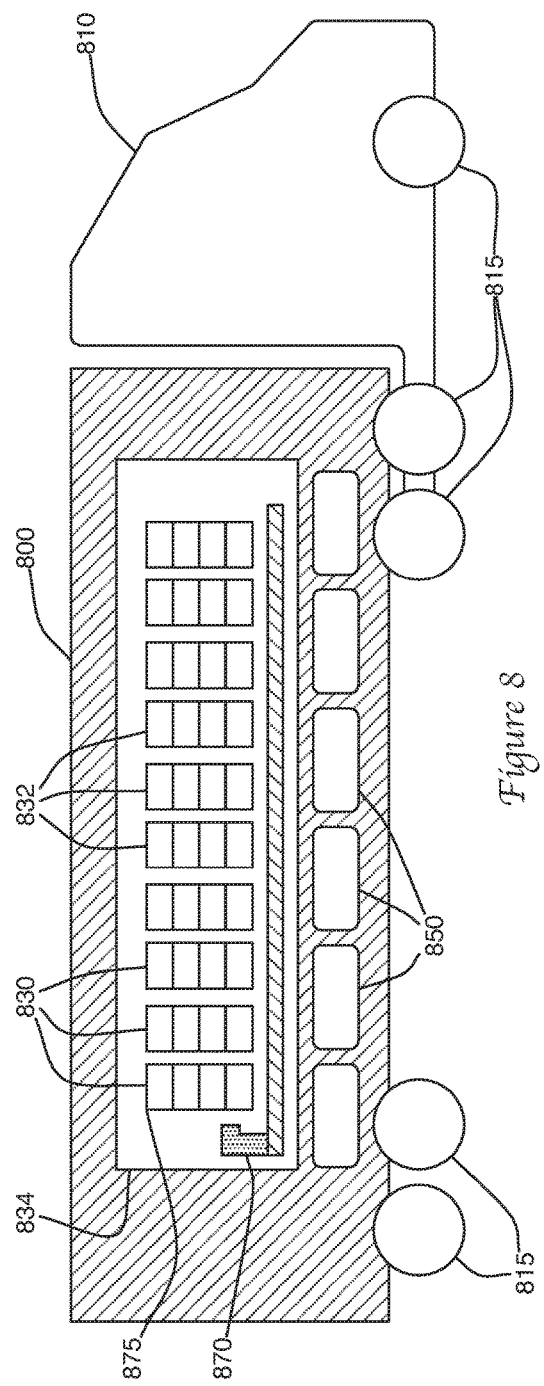
FIG. 8 is a schematic view of a mobile retail sales vehicle.

The robotic wall described above may also be used in a mobile vehicle to sell products at many different locations. FIG. 8 is a schematic view of a mobile retail sales vehicle. In the illustrated embodiment, the vehicle comprises a wheeled truck 810 and a wheeled semi-trailer 800 with wheels 815. Trailer 800 contains an inventory 830 of a plurality of products 832 for sale. Inventory 830 is stored in a robotic wall 875 for later retrieval when products 832 are purchased. The robotic wall 875 may utilize robotics 870 to locate and retrieve products 832. The inventory 830 is shielded from the exterior of trailer 800 by a transparent barrier 834, which allows the robotics 870 and inventory 830 to be viewed, while still keeping products 832 out of reach from customers outside of trailer 800. Multiple kiosks 850 are present on the side of trailer 800. The kiosks 850 allow multiple users to browse the inventory 830 and purchase products 832. The robotics 870 used in the system allow all kiosks 850 to access the same inventory 830, which allows trailer 800 to carry a much larger selection of products 832 than if each kiosk 850 had a separate inventory not accessible by other kiosks 850.

Figure 9:
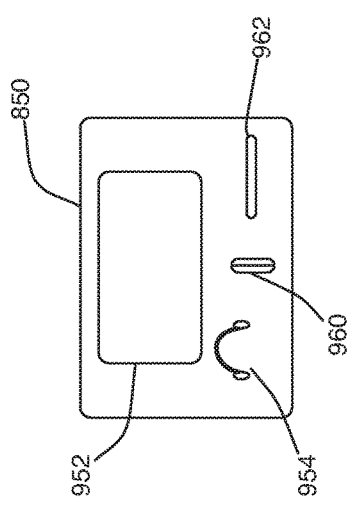
FIG. 9 is a schematic view of kiosks used with the mobile retail sales vehicle.

FIG. 9 is a schematic view of a kiosk 850 for use with the mobile retail sales vehicle. Kiosk 850 may include a display screen 952, a media headset 954, a credit card reader 960, and a receipt printer 962. Kiosk 850 may have more or fewer features than the embodiment shown in FIG. 9. In one embodiment, display 952 is a visual display with touch-screen capabilities. Kiosk 850 may also include a keyboard or keypad for browsing products in inventory 830. Headset 954 allows a purchaser to preview music or media content before making a purchase. When a product 832 is selected at kiosk 850, robotics 870 locate product 832 in the robotic wall 875 and deliver the product 832 to the purchaser. Robot wall 875 is comprised of a plurality of rows and columns of products suspended on rails, and may have product holders or bins in which to hold products, or may alternately provide physical hanger attachments for the packaging of products in inventory 830. Horizontal rows of robot wall 875 may include lids or covers to keep suspended products from shaking or falling while mobile vehicle 800 is in motion. Robot wall 875 and robotics 870 may be implemented using hydraulic, pneumatic, or electronic robotics, and may be driven by gears, belts, conveyors, or actuators.

In one embodiment of kiosks 850, a product 832 may be purchased by using card reader 960 to swipe a credit card, debit card, gift card, etc. A purchase delivery area is provided next to each kiosk 850 to deliver the selected product after the purchase price has been paid. In other embodiments, payment is received at the kiosk 850 but the product is delivered to a common product delivery area for all kiosks 850. In these embodiments, a paid-in-full receipt is printed at printer 962 that can be used to acquire the product at the product delivery area. In yet another alternate embodiment, a purchaser makes a request for a product 832 but does not pay for the product 832 at kiosk 850, after which the kiosk 850 issues a receipt through receipt printer 962. The robotics 870 then delivers the product 832 to a common point of sale location for all kiosks 850, where the product purchase transaction can be completed.

Figure 10:
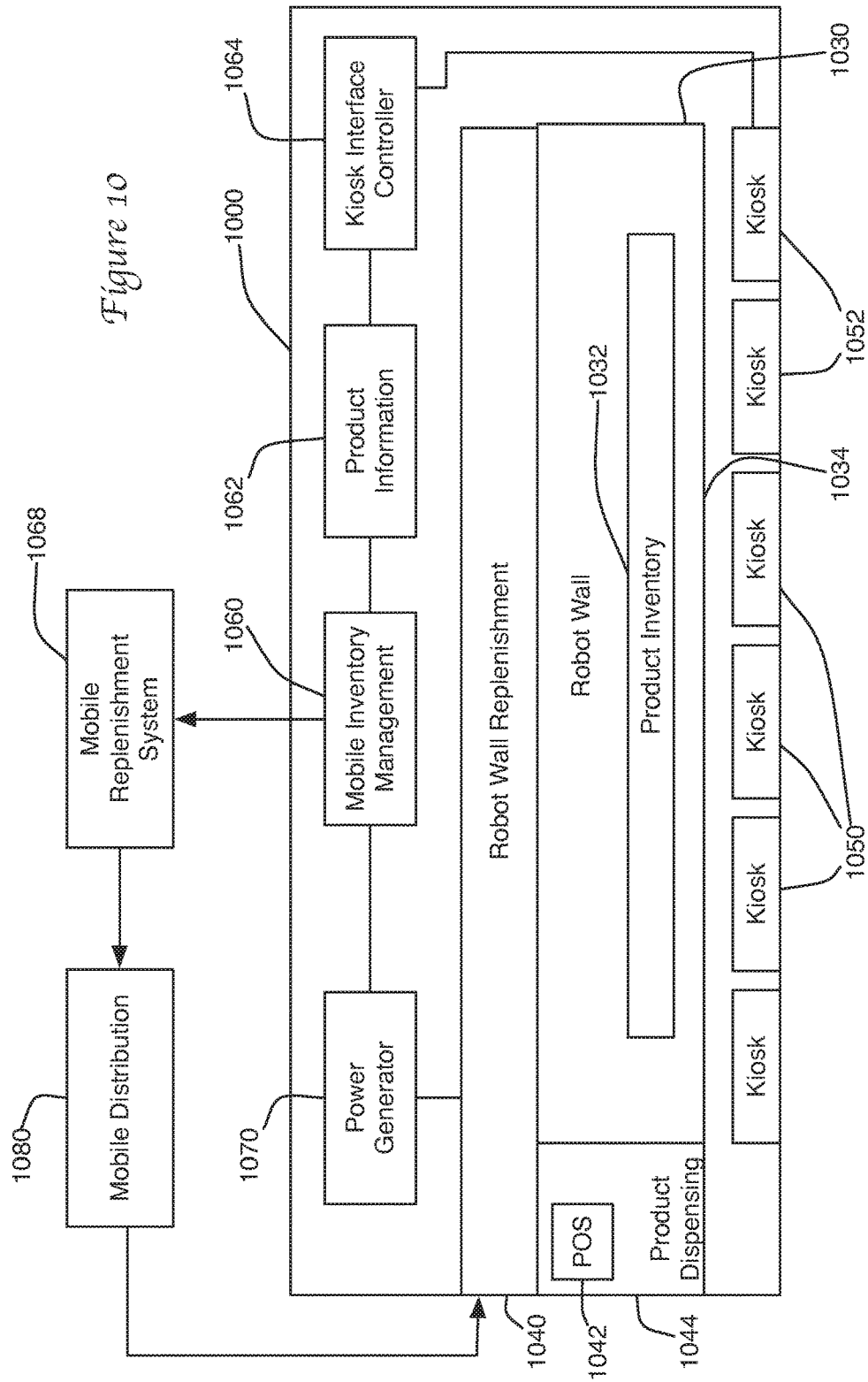
FIG. 10 is a schematic view of a mobile retail sales vehicle and mobile replenishment system.

FIG. 10 is a schematic diagram of a mobile retail sales vehicle and mobile replenishment system. Mobile vehicle 1000 contains a product inventory 1032 contained within a robotic wall 1030. A transparent barrier 1034 provides a view of robot wall 1030 from the exterior of mobile vehicle 1000, while protecting the contents within vehicle 1000. A plurality of kiosks 1050 allow multiple purchasers to select items from the product inventory 1032. After selection, products can then be delivered to product dispensing area 1044 at one location in mobile vehicle 1000. Purchase transactions may be made at point of sale register 1042 located near product dispensing area 1044. Mobile vehicle 1000 could alternately contain multiple product dispensing areas 1044 and/or multiple POS registers 1042. Alternatively, all purchase transaction could be completed at the kiosks 1050, eliminating the need for a POS register 1042 to be located at the product dispensing area 1044.

Mobile vehicle 1000 is preferably a completely independent unit. A power generator 1070 within vehicle 1000 allows the entire system to function without the need for electrical power from an outside source, making mobile vehicle 1000 a self-contained system. In an alternate embodiment, vehicle 1000 could be powered by an external power source. A mobile inventory management system 1060 within mobile vehicle 1000 may collect product and sales data, and may create requests for product inventory 1032. The mobile inventory management computer 1060 consists of a processor that is programmed through programming instructions that both reside in a tangible, non-transitory memory located within mobile vehicle 1000. Product information data 1062 may also be stored in a tangible, non-transitory memory. In one embodiment, the product information 1062 is stored in a structured database whose data and related programming are found in the memory associated with the computer 1060. Kiosk interface controller 1064 retrieves product information 1062 on demand when requested at kiosks 1052. Kiosk interface controller 1064 is generally a standard computer, similar to the mobile inventory management computer 1060, having a processor and memory storing programming for performing functions at the kiosks 1050. Although shown in FIG. 10 as a separate structure, kiosk interface controller 1064 could be at the same computer that operates the mobile inventory management computer 1060. Product information 1062 may include product titles, descriptions, video and audio previews, images, and other information relevant to products in inventory 1032.

Mobile inventory management system 1060 provides an interface with an external mobile replenishment system 1068. Sales information for one or more vehicle locations is sent from inventory management system 1060 to replenishment system 1068. Replenishment system 1068 collects data from one or more mobile vehicles 1000 and uses the collected data to produce an inventory replenishment plan for inventory 1032. Once the replenishment plan is determined. Replenishment system 1068 sends a request to mobile distribution system 1080. The mobile replenishment system 1068 and mobile distribution system 1080 may perform a method of replenishing product inventory 1032 for a plurality of mobile vehicles 1000.

When mobile distribution system 1080 provides replenished products to mobile vehicle 1000, products are sent to the physical location of mobile vehicle 1000. Robot wall replenishment area 1040 provides a single point of entry for products to be added to product inventory 1032. In one embodiment, robotics 870 may be capable of independently receiving products 832 at replenishment area 1040 and storing the products 832 within robot wall 875.

Figure 11:
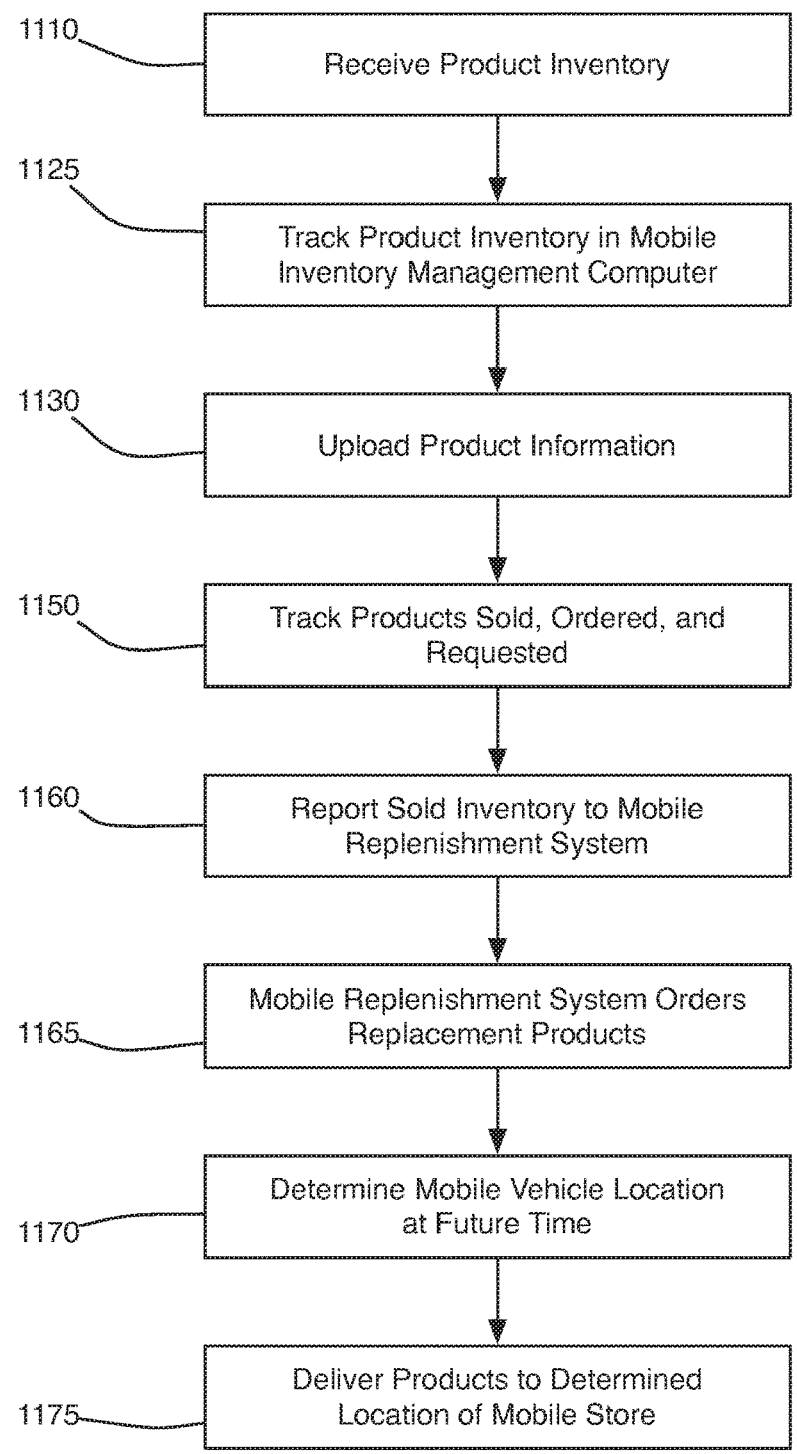
FIG. 11 is a flow chart showing a method for replenishing product inventory in a mobile retail sales vehicle.

FIG. 11 is a flow chart showing a method for replenishing product inventory 1032 in a mobile retail sales vehicle 1000. Although the methods shown in the figures of this application are presented as a series of sequential steps, some steps may be performed in a different order. It would also be possible to implement variations that exclude steps or that include additional steps. In step 1110, product inventory is received at mobile sales vehicle 1000 at robotic wall replenishment area 1040. Products are then placed into robotic wall 875. In step 1125, mobile inventory management computer 1060 tracks inventory 1032 as it is received and sold. In addition to the products themselves, it is necessary that product information 1062 for the added products be available to the kiosk interface controller 1064. In the preferred embodiment, product information 1062 is updated in the system whenever new products in inventory 1032 are added. In an embodiment in which mobile vehicle 1000 does not have access to a high-speed data network for kiosk browsing, product information 1062 may be uploaded in step 1130 from a physical memory source, such as an external hard drive, flash memory drive, data disc, etc. Information 1062 for products not in inventory 1032 may also be added. In this case, the information 1062 can still be accessed at kiosk 1052 even though the product is not immediately available for sale. Unavailable products may be ordered via the Internet, for example. Unavailable products may also be requested at the kiosks. Mobile inventory management computer 1060 could later transfer the request for these products to mobile replenishment system 1068. The requested product could be delivered directly to the user at an address specified by the user through kiosk 1050. Data that the product was desired and requested by a user could be used by the replenishment system 1068 to provide that product to mobile vehicle 1000 the next time that new product inventory 1032 is shipped to mobile vehicle 1000 so that the product would be available for future customers.

In step 1150, as products are sold, ordered, or requested, the mobile inventory management computer 1060 tracks the information internally using a processor and a tangible, non-transitory memory located in mobile vehicle 1000. At particular intervals, in step 1160 the mobile inventory management computer 1060 sends a report or other data transmission indicating the number of sold, ordered, and/or requested products to the mobile replenishment system 1068. The report could be made daily, could be made whenever replenishment system 1068 sends new products to mobile vehicle 1000, or could be made when mobile vehicle 1000 moves to a new physical location. Other appropriate intervals will also be apparent. In step 1165, the mobile replenishment system 1068 uses the reported sales information to determine which products should be sent as replenishment product to mobile vehicle 1000. The determination of products to replenish may be made based on a number of additional factors, such as previous sales data, demographic data of the population at a particular location, category of sold products (e.g., movies, video games, etc.), or sales data from conventional "brick-and-mortar" stores. Sales data from multiple mobile vehicles 1000 may be combined. Because of the mobile nature of the vehicle 1000, in step 1170, the mobile replenishment system 1068 must determine the future location of mobile vehicle 1000. In some cases, the location of mobile vehicle 1000 on any particular date and time may be planned far in advance. In other situations mobile vehicle 1000 may move to a new location on short notice, based on consumer demand at a particular location. In step 1175 the replenishment products are delivered to the determined location. The delivery may be made by distribution from a location warehouse.

Figure 12:
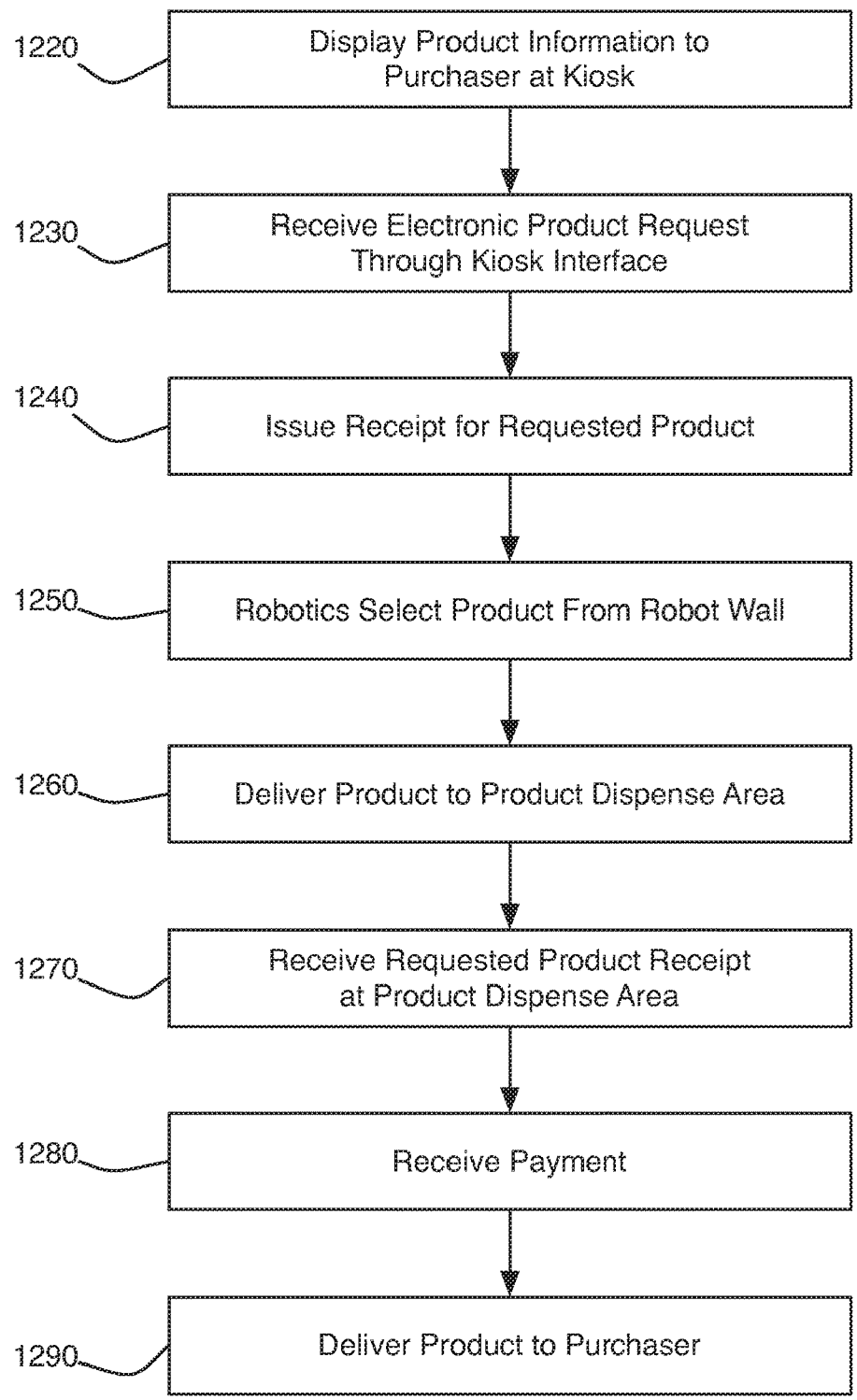
FIG. 12 is a flow chart showing a method for delivering product to a purchaser at a mobile retail sales location.

FIG. 12 is a flow chart showing a method for delivering product 1032 to a purchaser at a mobile retail sales vehicle 1000. In step 1220, product information 1062 is displayed to a purchaser at kiosk 1050. A product request is received through the interface of kiosk 1050 in step 1230. In step 1240, a product receipt for the requested product 832 is issued to the purchaser. In step 1250, robotics 870 locate and retrieve the product 832 within robotic wall 875. In step 1260, the robotics 870 deliver product 832 to product dispensing area 1044, where payment is received at point of sale 1042 in step 1280. The product 832 is delivered to the purchaser in step 1290 after payment has been received in step 1280.

Figure 13A:
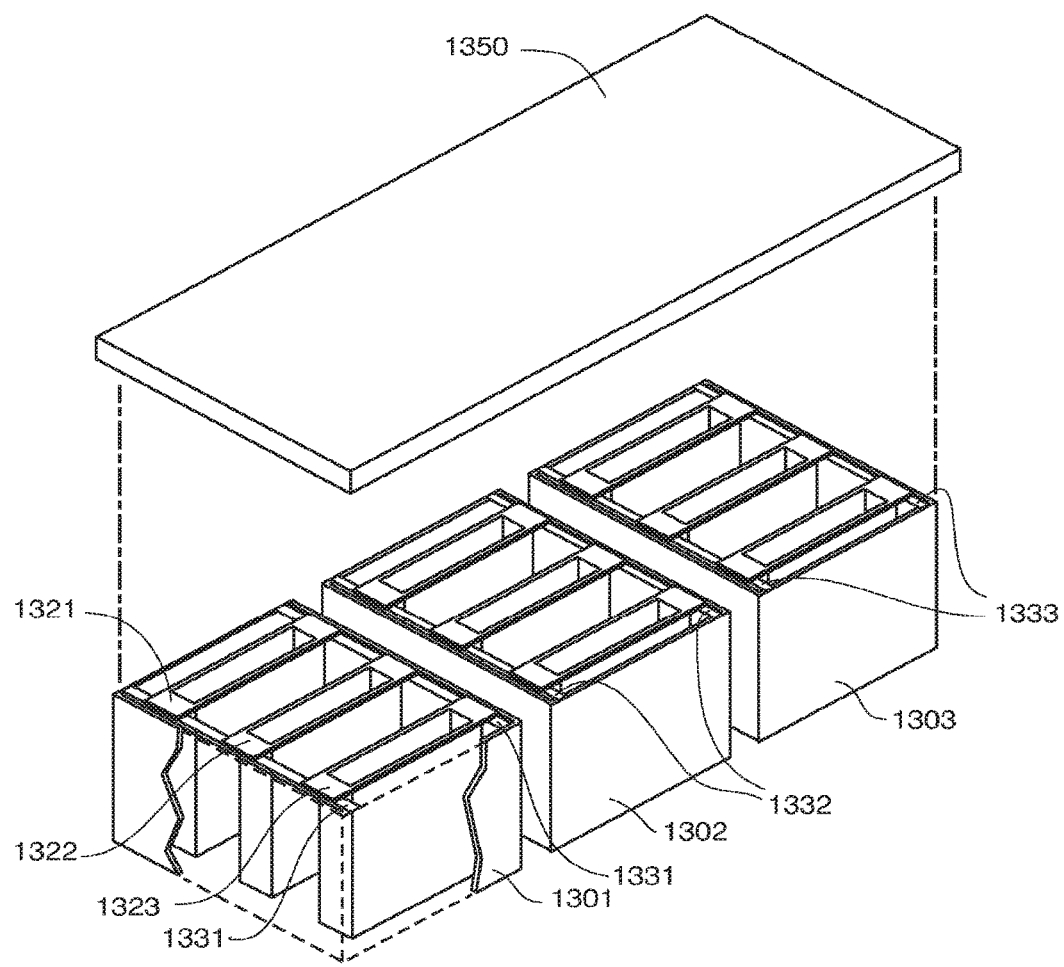
FIG. 13A is a schematic view of a system for securing items on a hanging rack in a mobile vehicle.

FIG. 13A is a schematic view of an apparatus for securing items on hanging racks. The apparatuses of FIG. 13A-13C may be implemented in a system utilizing robotics as shown and described in U.S. patent application Ser. No. 13/192, 873, assigned to PaR Systems, Inc. and entitled "Robotic Storage and Retrieval Systems." The racks may be situated in the robotic wall 875 of the mobile retail sales vehicle 800 in FIG. 8. Racks 1301, 1302, 1303 are laid out in a horizontal row. Rack 1301 has two parallel horizontal rails 1331 on each side of rack 1301. Rails 1331 suspend a plurality of bins or product carriers 1321, 1322, 1323. Racks 1302, 1303 also suspend product carriers on parallel horizontal rails 1332 and 1333 respectively. Product carriers 1321, 1322, 1323 each have lips that overhang rails 1331 and that hold the product carriers 1321, 1322, 1323 in place. Racks 1301, 1302, 1303 allow robotics 870 to access products 832 held in product carriers 1321, 1322, 1323. However, when the mobile vehicle 800, 810 is in motion, for example driving at high speed on a highway, there is a risk that the product carriers 1321, 1322, 1323 will fall or become dislodged from rails 1331. To prevent this, a rack cover 1350 is provided. In the embodiment of FIG. 13A, the cover 1350 is a solid lid. The solid may be constructed of metal, wood, plastic, vinyl, fabric, or other appropriate solid material. The cover 1350 is movable between an open position that is not in contact with the racks, to a restraint position that is in contact with the racks. When the cover 1350 is not covering the racks 1301, 1302, 1303, robotics 870 may retrieve products 832 from product carriers 1321, 1322, 1323. When cover 1350 is lowered into the restraint position, the cover 1350 prevents product carriers 1321, 1322, 1323 from dislodging from rails 1321. In the restraint position, robotics 870 are not able to access products 832 within product carriers 1321, 1322, 1323.

FIG. 13B shows a second embodiment of a product rack cover. In this embodiment, a cover 1370 provides a mesh 1365 instead of a solid lid. The mesh may be metal, wood, plastic, fabric, or other appropriate mesh material.

FIG. 13C shows a third embodiment of a product rack cover. In this embodiment, cover 1360 provides arms 1371, 1372, 1373 that may be lowered over the rails of racks 1301, 1302, 1303. The cover 1360 is a single structure that allows arms 1371, 1372, 1372 to raise and lower simultaneously. Unlike the embodiments of FIG. 13A-13B, the embodiment of 13C may allow robotics 870 to access products 832 contained in product carriers 1321, 1322, 1323 while still preventing the product carriers 1321, 1322, 1323 from dislodging from rails 1331, 1332, 1333.

Figure 14:
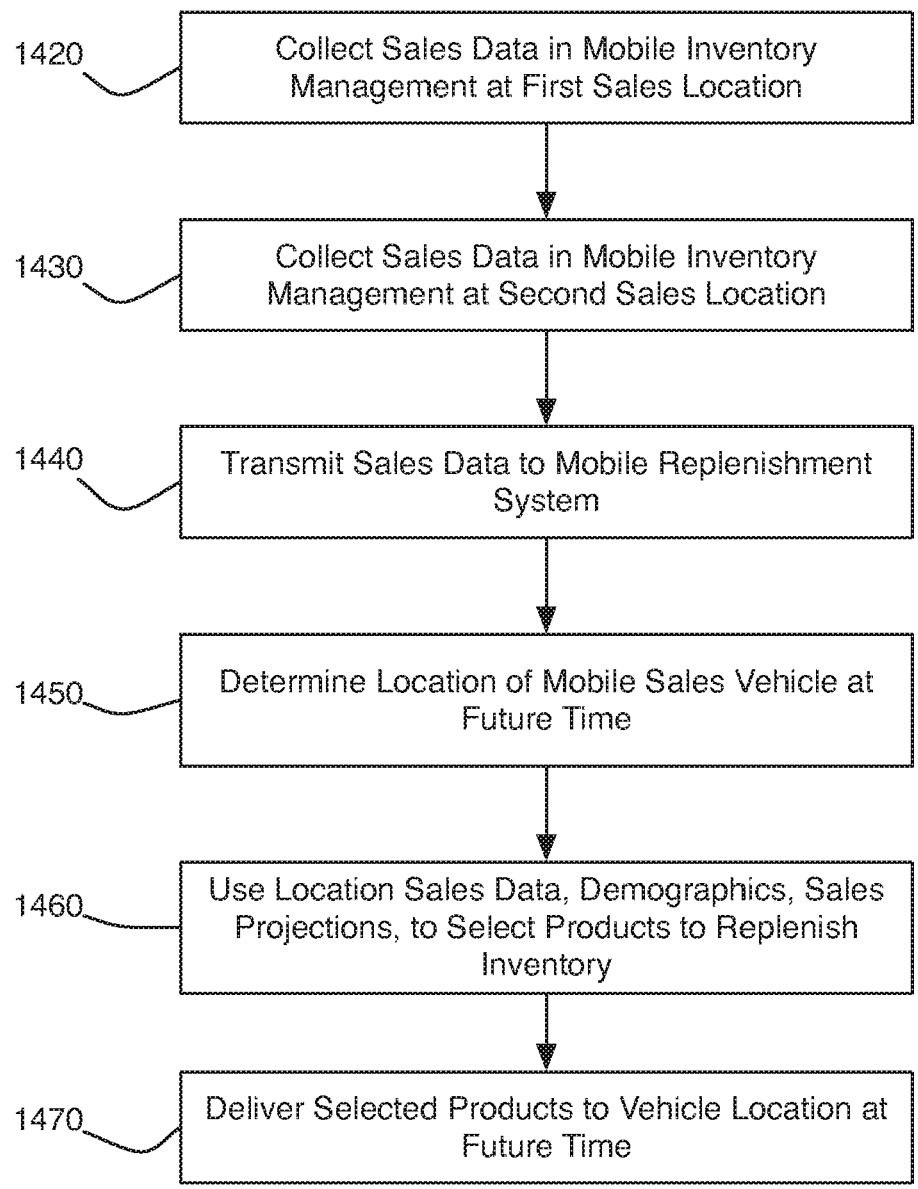
FIG. 14 is a flow chart showing a method for replenishing product inventory for a mobile retail sales vehicle in multiple locations.

FIG. 14 is a flow chart showing a method for replenishing product inventory 1032 for multiple geographic locations. The method may be performed using one or more mobile vehicles 1000 as shown in FIG. 10. In step 1420, sales data from one or more mobile vehicles at a first sales location is collected. A "location" as used in the method could have different degrees of granularity. In a narrow sense, a location could be a particular street intersection, street address, or GPS coordinates, etc. The location could also be defined as a single city, a group of two or more adjacent cities, a county, a state, or another predefined geographic unit. The location could be defined as an area within a particular radius distance from a geographic point such as the center of a ZIP code. In an embodiment in which the first sales location is defined as a city, sales data for a mobile vehicle 1000 could be collected in different parts of a single city and collected as a single data set. Additionally, a first mobile vehicle 1000 could be present at a first set of coordinates within the city and a second mobile vehicle 1000 could be present at a second, different set of coordinates within the city, and sales data from each mobile vehicle 1000 could be collected and used as a single data set in step 1420. In step 1430, a second set of sales data is collected from one or more mobile vehicles 1000 for a second sales location.

In step 1440, the sales data collected in steps 1420 and/or 1430 are transmitted from the mobile inventory management 1060 to the mobile replenishment system 1068. In step 1450, mobile replenishment system 1068 determines a location of a single mobile vehicle 1000 at a future time. The location may be statically planned in advance, or may be chosen dynamically based on actual sales and sales projections for a particular location. In step 1460, using the collected location sales data, the mobile replenishment system 1060 selects products to replenish the individual product inventory 1032 for the one or more mobile vehicles 1000. In this step, the mobile replenishment system 1060 also preferably uses other information to provide a customized product inventory for a single mobile sales vehicle 1000, such as population demographics for the determined location, new product sales projections, market research, or other data to optimize the product inventory 1032 selection. In step 1470, mobile replenishment system 1068 delivers the selected replenishment product inventory 1032 to the determined location of mobile vehicle 1000.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A system for transporting and selling products, the system comprising:
   a wheeled mobile retail sales vehicle having a semi-trailer, the semi-trailer containing:
      a product rack having a first horizontal rail and a second horizontal rail parallel to the first rail,
      a first product suspended by a first pair of overhang lips overhanging the first and second rails,
      a second product suspended by a second pair of overhang lips overhanging the first and second rails, and
      robotics operable to retrieve the first and second products from the product rack and deliver the first and second products to a product delivery area provided from the semi-trailer;
   a product rack cover, the product rack cover movable between a restraint position in which the product rack cover is engaged with the first and second pair of overhang lips, and an open position in which the product rack cover is not engaged with the first and second pair of overhang lips; and
   wherein the robotics are able to retrieve the first and second products when the product rack cover is in the open position, and the robotics are unable to retrieve the first and second products when the product rack cover is in the restraint position.

2. The system of claim 1, further comprising:
   a plurality of additional product racks aligned in vertical columns and horizontal rows; and
   a plurality of additional product rack covers positioned to cover the horizontal rows, each product rack cover having a restraint position and an open position.

3. The system of claim 1, wherein the product rack cover comprises a solid lid.

4. The system of claim 1, wherein the product rack cover comprises a wire mesh.

5. The system of claim 1, wherein the product rack cover comprises a pair of parallel horizontal arms spaced apart substantially the same distance as the first and second rails, wherein the horizontal arms are moveable in concert to engage the first and second pair of overhang lips in the restraint position and disengage the first and second pair of overhang lips in the open position.

6. The system of claim 5, further comprising a plurality of additional product racks aligned in a horizontal row, wherein the product rack cover further comprises a plurality of additional pairs of parallel horizontal arms aligned in a horizontal plane, each pair of horizontal arms being spaced apart substantially the same distance as rails of the additional product racks.

7. The system of claim 1, further comprising a kiosk, the kiosk having a user interface to allow selection of the first product based on a first product identifier, the kiosk to:
   trigger a command for the robotics to locate the first product at a first stocking location chosen from one or more stocking locations, using the first product identifier; and
   deliver the first product to the product delivery area.

8. The system of claim 7, further comprising a plurality of additional kiosks, each having a separate user interface, wherein each kiosk is configured to trigger respective commands for the robotics to select additional products and deliver the additional products to the product delivery area.

9. The system of claim 1, further comprising:
   a robotic wall attached to the semi-trailer, wherein the product rack is one of a plurality of product racks hosted within the robotic wall; and
   a barrier between an interior and an exterior of the robotic wall;
   wherein the product delivery area passes from the interior to the exterior of the robotic wall.

10. The system of claim 9, further comprising an electronic tracking system, the electronic tracking system to maintain inventory and track respective stocking locations of a plurality of products including the first and second products within the plurality of product racks hosted within the robotic wall.

11. The system of claim 1, wherein the robotics operate to:
   stock a plurality of products including the first and second products within an inventory area that includes the product rack, wherein the plurality of products are automatically stocked at respective stocking locations by the robotics throughout the inventory area to mix stocking locations of different retail products associated with different product identifiers;
   locate the first product from the inventory area based on a corresponding stocking location; and
   deliver the first product to the product delivery area.

12. A system for transporting and selling products, the system comprising:
   a storage unit attachable to a mobile vehicle, the storage unit defining:
      a product rack having a first horizontal rail and a second horizontal rail parallel to the first rail,
      a first product suspended by a first pair of overhang lips overhanging the first and second rails, and
      a second product suspended by a second pair of overhang lips overhanging the first and second rails;
   robotics operable to retrieve the first and second products from the product rack and deliver the first and second products to a product delivery area provided from the mobile vehicle; and
   a product rack cover engageable with the storage unit, the product rack cover movable between a restraint position in which the cover is engaged with the first and second pair of overhang lips, and an open position in which the product rack cover is not engaged with the first and second pair of overhang lips;
   wherein the robotics are able to retrieve the first and second products when the product rack cover is in the open position, and the robotics are unable to retrieve the first and second products when the product rack cover is in the restraint position.

13. The system of claim 12, further comprising:
a plurality of additional product racks aligned in vertical columns and horizontal rows; and
a plurality of additional product rack covers positioned to cover the horizontal rows, each product rack cover having a restraint position and an open position.

14. The system of claim 12, wherein the product rack cover comprises a solid lid.

15. The system of claim 12, wherein the product rack cover comprises a wire mesh.

16. The system of claim 12, wherein the product rack cover comprises a pair of parallel horizontal arms spaced apart substantially the same distance as the first and second rails, wherein the horizontal arms are moveable in concert to engage the first and second pair of overhang lips in the restraint position and disengage the first and second pair of overhang lips in the open position.

17. The system of claim 12, further comprising a plurality of additional product racks aligned in a horizontal row, wherein the product rack cover further comprises a plurality of additional pairs of parallel horizontal arms aligned in a horizontal plane, each pair of horizontal arms being spaced apart substantially the same distance as rails of the additional product racks.

18. The system of claim 12, further comprising a kiosk, the kiosk having a user interface to allow selection of the first product based on a first product identifier, the kiosk to:
trigger a command for the robotics to locate the first product at a first stocking location chosen from one or more stocking locations, using the first product identifier; and
deliver the first product to the product delivery area.

19. The system of claim 18, further comprising a plurality of additional kiosks, each having a separate user interface, wherein each kiosk is configured to trigger respective commands for the robotics to select additional products and deliver the additional products to the product delivery area.

20. The system of claim 18, further comprising:
a robotic wall located within the storage unit, wherein the product rack is one of a plurality of product racks hosted within the robotic wall; and
a barrier between an interior and an exterior of the robotic wall;
wherein the product delivery area passes from the interior to the exterior of the robotic wall.

21. The system of claim 20, further comprising an electronic tracking system, the electronic tracking system to maintain inventory and track respective stocking locations of a plurality of products including the first and second products within the plurality of product racks hosted within the robotic wall.

22. The system of claim 18, wherein the robotics operate to:
stock a plurality of products including the first and second products within an inventory area that includes the product rack, wherein the plurality of products are automatically stocked at respective stocking locations by the robotics throughout the inventory area to mix stocking locations of different retail products associated with different product identifiers;
locate the first product from the inventory area based on a corresponding stocking location; and
deliver the first product to the product delivery area.

* * * * *